No. 699,382. Patented May 6, 1902.
B. GALLAGHER.
TROLLEY WHEEL TURNING MACHINE.
(Application filed Apr. 11, 1900.)
(No Model.) 4 Sheets—Sheet 1.

WITNESSES INVENTOR
Bernard Gallagher
by Louis H. Harriman
Atty

No. 699,382. Patented May 6, 1902.
B. GALLAGHER.
TROLLEY WHEEL TURNING MACHINE.
(Application filed Apr. 11, 1900.)
(No Model.) 4 Sheets—Sheet 2.

WITNESSES INVENTOR
Bernard Gallagher

No. 699,382. Patented May 6, 1902.
B. GALLAGHER.
TROLLEY WHEEL TURNING MACHINE.
(Application filed Apr. 11, 1900.)
(No Model.) 4 Sheets—Sheet 3.
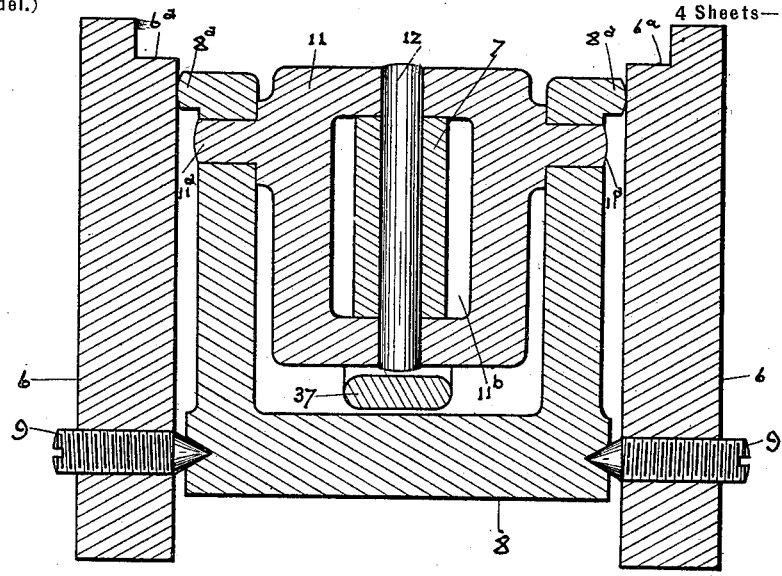
FIG. 4.
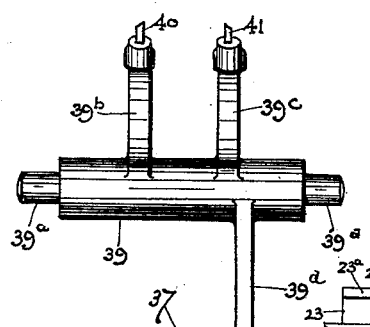
FIG. 5.
FIG. 8.
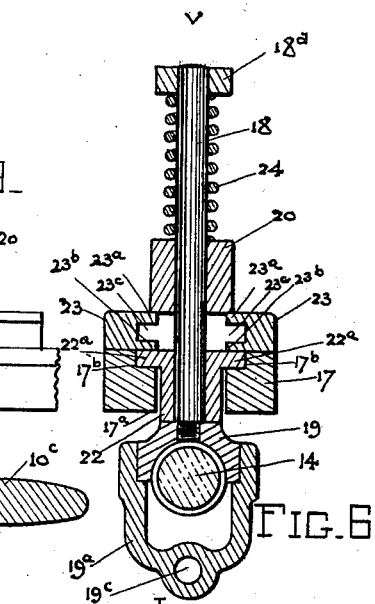
FIG. 6.
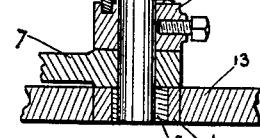
FIG. 7.
WITNESSES
M. C. Jaquith
INVENTOR
Bernard Gallagher
by Louis H. Harriman
Atty
THE NORRIS PETERS CO., PHOTO-LITHO., WASHINGTON, D. C.

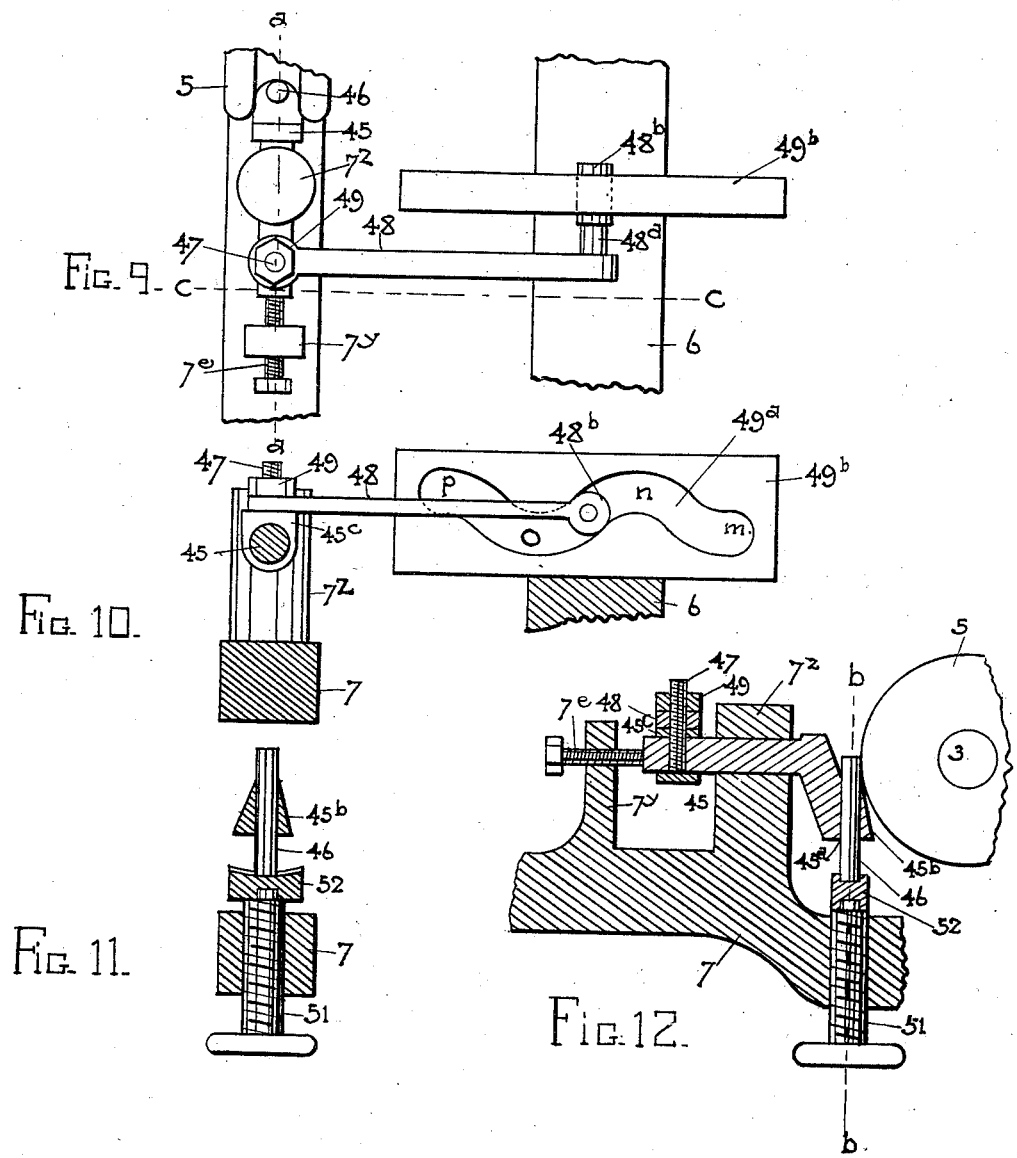

UNITED STATES PATENT OFFICE.

BERNARD GALLAGHER, OF LYNN, MASSACHUSETTS.

TROLLEY-WHEEL-TURNING MACHINE.

SPECIFICATION forming part of Letters Patent No. 699,382, dated May 6, 1902.

Application filed April 11, 1900. Serial No. 12,423. (No model.)

*To all whom it may concern:*

Be it known that I, BERNARD GALLAGHER, a citizen of the United States, and a resident of Lynn, in the county of Essex and State of Massachusetts, have invented certain new and useful Improvements in Trolley-Wheel-Turning Machines, of which the following is a specification.

This invention relates to a machine which is adapted to automatically turn off the surface of trolley-wheels, so that after the trolley-wheel has been placed in the machine the entire surface of the wheel will be removed without further attention on the part of the operator.

Prior to my invention it has been the custom to simply turn down the face of the wheel with a tool of precisely the same shape as the face and then square up the ends of the hubs, leaving the sides thereof unfinished. With my invention, however, I am enabled to remove the scale from all portions of the wheel at one operation.

For an understanding of my invention reference is made to the accompanying drawings, in which—

Figure 1:
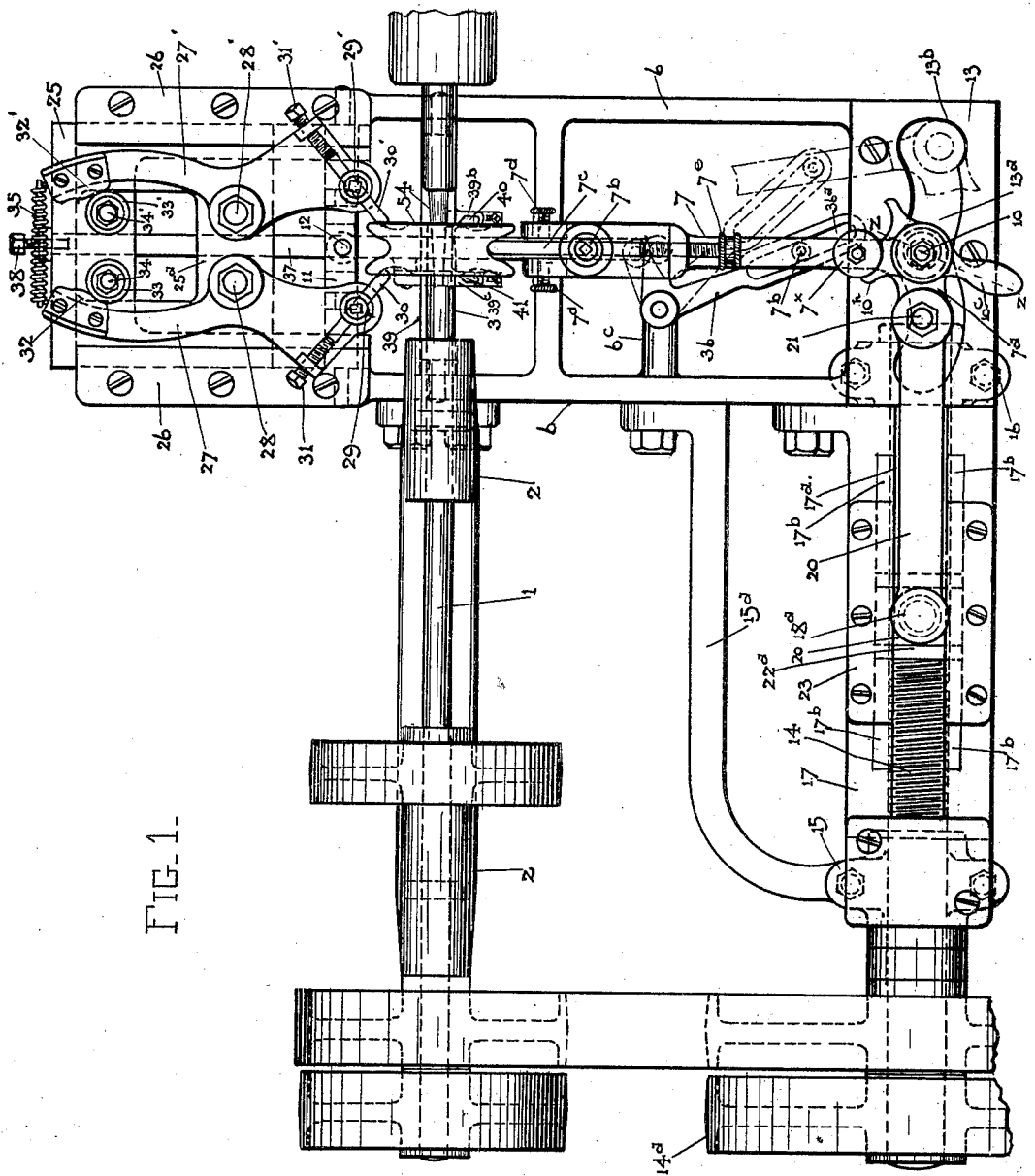
Figure 2:
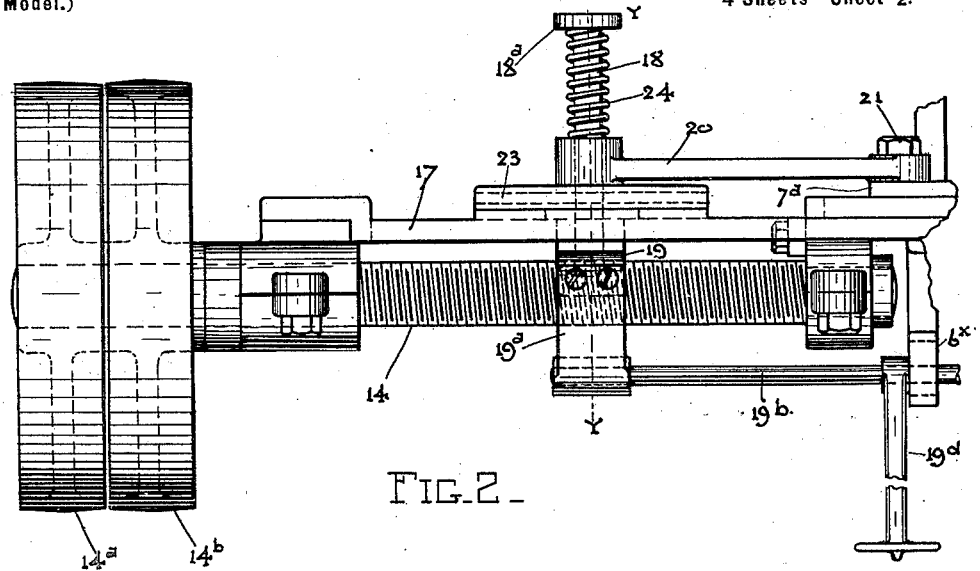
Figure 3:
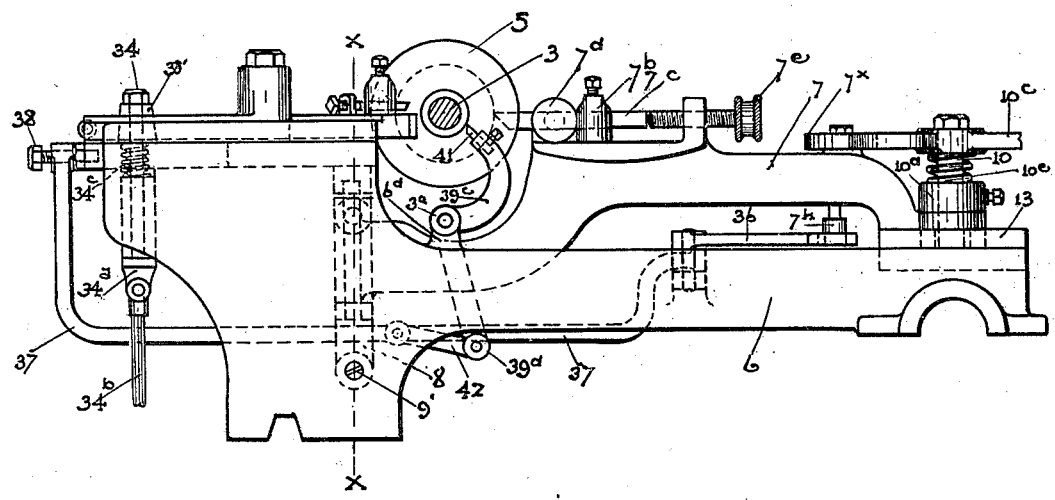

Figure 1 is a plan view of the machine, showing the parts assembled. Fig. 2 is a partial front elevation thereof. Fig. 3 is a side elevation of the main portion thereof. Fig. 4 is an enlarged cross-section on the line X X of Fig. 3. Fig. 5 is a detail view on the tools for squaring the hub. Fig. 6 is a section on the line Y Y of Fig. 2. Fig. 7 is a detail cross-section on the line Z Z of Fig. 1. Fig. 8 is a side view of the guides which hold the feed-nut in engagement. Fig. 9 is a detail plan view of a modified form of tool-holding mechanism. Fig. 10 is an end elevation thereof. Fig. 11 is a cross-section on the line $b\ b$ of Fig. 12. Fig. 12 is a cross-section on the line $a\ a$ of Fig. 9.

The main shaft 1 is supported in suitable bearings 2 and is provided with an arbor 3, having the outer end split and provided with an axial hole. A tapered spreader 4 is supported in front thereof, so that it may be forced into the hole of the arbor and spread the arbor sufficiently to clamp the trolley-wheel 5 thereon. This method of securing the work to the driving-shaft forms no part of my invention and is therefore only referred to and shown in a general way. Any other well-known means for securing the trolley-wheel to the shaft may be substituted.

The main frame 6 is suitably supported under the shaft 1, so that the middle thereof will come directly under the wheel 5 when the latter is clamped in position on the arbor 3. The main operating-lever 7 is pivoted to frame 6 at one end, so that it is capable of universal movement. The form of universal joint used by me is shown in detail in Fig. 4 and consists of a U-shaped frame 8, which is pivoted near its bottom to the inner sides of frame 6. The pointed pivot-screws 9 engage the sides of frame 8, as shown. The upper sides of frame 8 are provided with projecting lugs $8^a$, which are of sufficient length to engage the side of frame 6 and prevent lateral movement of said frame 8, permitting the same to swing freely on its pivots. A rectangular-shaped block 11 is pivoted near its top in the upper portion of frame 8 by means of laterally-projecting lugs $11^a$ and is fitted between frame 8, so as to prevent lateral movement on its lugs $11^a$. A central opening $11^b$ is provided in block 11, and the rear end of lever 7 is located therein and is pivoted on the vertical pin 12, which passes upwardly through block 11. It will thus be seen that lever 7 is capable of swinging movement on pin 12 and reciprocating movement on the pivots 9 and $11^a$. A cam-plate 13 is secured to the front end of said frame 6, having a cam-slot $13^a$, which is shaped according to the particular requirements of the work to be operated on. A bolt 10 passes through an aperture in the front end of lever 7 and has an eccentric head $10^a$ on its lower end. A roll $10^b$, which closely fits the cam-path $13^a$, is journaled on the said head $10^a$. A lever $10^c$ is pivoted on the upper end of said bolt 10, and a collar $10^d$ is secured thereto. A spring $10^e$ is secured to said collar and lever $10^c$ at its opposite ends, and the tension thereof is adjusted so that the projection $10^h$ on lever $10^c$ is always held in engagement with projection $7^\times$ on lever 7. The eccentric head $10^a$ and spring $10^e$ tend to throw the bolt 10 to the forward position, (shown in Fig. 7,) so that lever 7 will be moved toward the work as far as possible. When, however, lever $10^c$ is thrown to the right against the tension of spring $10^e$, bolt 10 will be rotated, and the eccentric head 10ª will cause the bolt to be thrown back a short distance, drawing lever 7 away from the work. The slot 13ª is symmetrical, with the exception that the right-hand end is provided with a notch 13ᵇ, in which the roll 10ᵇ rests when the lever 7 is in its initial position. The upper edge of lever 7 is provided with a tool-post 7ᵇ, in which the tool 7ᶜ is supported. Tool 7ᶜ is of the ordinary round-nose form and is braced against lateral movement by the screws 7ᵈ and against backward movement by screw 7ᵉ.

A shaft 14 is journaled in bearings 15 and 16, the bearing 15 being supported by the bracket 15ˣ on the main frame 6, and bearing 16 is supported directly by said frame 6. Shaft 14 is screw-threaded between said bearings and is provided with a tight and loose pulley 14ª 14ᵇ. These pulleys may be driven from the main shaft 1, as shown in Fig. 1.

An arm 17, having a longitudinal slot 17ª, is secured to frame 6 and extends to bearing 15, to which it is secured. A vertical rod 18, having a split or half nut 19 secured to its lower end, extends upwardly through said slot. (See Fig. 6.) A U-shaped extension 19ˣ is secured to the under side of half-nut 19, and a horizontal rod 19ᵇ passes through an aperture 19ᶜ in the extension 19ª and through an elongated aperture (shown in dotted lines, Fig. 2) in the arm 6ˣ, which is secured to the frame 6. A treadle 19ᵈ is secured to rod 19ᵇ.

A link 20 is pivoted at one end to an ear 7ª on lever 7 by bolt 21 and at its opposite end is provided with an aperture, through which the rod 18 passes. A square collar 22, which fits the slot 17ª, so as to slide freely therein, is placed on rod 18 directly above nut 19. The upper end of said collar is provided with lugs 22ª on each side, and side grooves 17ᵇ are provided in the upper side of the arm 17 adjacent said groove 17ª for lugs 22ª, so that the latter may come flush with the surface of arm 17. Plates 23 are secured to the upper side of arm 17 and are provided with inwardly-projecting flanges 23ª 23ᵇ, the upper flanges 23ª extending the entire length thereof and the under flange 23ᵇ being arranged midway of the ends of the plates, having a length equal to the distance which the roll 10ᵇ may travel in the cam-slot 13ª less the width of the lugs 22ª of collar 22. (See Fig. 8.) Slots 23ᶜ are formed between flanges 23ª 23ᵇ, which are of the same width as the thickness of the lugs 22ª, and the edges of both flanges 23ª 23ᵇ project to a point which is substantially flush with the ends of slot 17ª.

Rod 18 is provided with a head 18ª, and a spring 24 is interposed between said head and the end of link 20. The latter rests on the flanges 23ª of plates 23, so that spring 24 constantly tends to force rod 18 upwardly and draw nut 19 out of engagement with screw 14. Said nut 19 is, however, held in engagement with said screw by reason of the engagement of lug 22ª with the under side of flange 23ᵇ.

When collar 22 is moved beyond either end of flange 23ᵇ, rod 18 will be forced upwardly by spring 24 and nut 19 lifted out of engagement with screw 14. The upward movement of rod 18 is limited by the engagement of lugs 22ª with the under side of flange 23ª.

As the castings of which trolley-wheels are made are very hard, and therefore dull the tools very rapidly, I have found in practice that if the ordinary round-nose tool is used it must be taken out and ground very often. The delay which is caused by the time taken to remove and readjust the tool is considerable. I have therefore devised a form of tool which though specially adapted for this purpose may be advantageously used in other relations. This form of tool is illustrated in Figs. 9, 10, 11, and 12, and consists of a cylindrical shank 45, having a vertical hole 45ª in its front end in which a cylindrically-shaped bit 46, having a flat cutting end, is placed. The front end of the shank is provided with a forwardly-extending and depending portion 45ᵇ, through which said aperture 45ª passes, and which is cut away so that the front side of said aperture terminates below the center of the shank. The main operating-lever 7 is provided with a tool-post 7ᶻ, in which the shank 45 of the tool is supported. The lever 7 is also provided with a lug 7ʸ, in which the set-screw 7ᵉ, similar to that shown in Fig. 1, is supported. Said set-screw bears against the end of the shank 45 and holds the tool up against the work. The shank of the tool is provided with an upright pin 47, which is suitably secured therein, and a bar 48 is pivoted to said pin 47 at one end and is secured thereon by the nut 49. The opposite end of the bar 48 is provided with a pin 48ª, and said pin has a roll 48ᵇ journaled thereon. The plate 49ᵇ is secured to the frame 6 of the machine, and said plate is provided with a cam-path 49ª, in which the roll 48ᵇ is located. A screw 51 is threaded in the lever 7 and carries a block 52 at its upper end, the latter being swiveled upon the former. The block 52 is convex on its upper surface and is provided with a groove 52ª of the same width as the diameter of the bit 46. This block is supported directly beneath the bit, and the lower end of the bit rests in said groove. The screw 51 will be adjusted so that the upper end of the bit 46 will be supported on a level with the central or axial line of the shank of the tool and of the shaft on which the work is supported, as shown in Fig. 12.

A sliding plate 25 is fitted in ways 6ª in the top of the sides of frame 6, (see Fig. 4,) and plates 26, which project over said ways 6ª, are secured to the tops of said sides and hold said plate 25 from upward movement. Levers 27 27' are pivoted on bolts 28 28', the latter being supported by the cross-bar 25ª, which connects the sides of plate 25. The front ends of said levers 27 27' are provided with tool-posts 29 29', in which the tools 30 30' are secured at an angle. Set-screws 31 31' engage the ends of said tools. The rear ends of said levers are provided with cam-plates 32 32', which are secured to the top of levers 27 27', respectively. Tapered rolls 33 33' are journaled on bolts 34 34', the latter being fixed in the end of a vertically-moving support 34$^a$, which is controlled in any convenient manner by a foot-lever (not shown) through the rod 34$^b$. (See Fig. 3.) Rolls 33 33' are constantly forced upward to their fullest extent by spring 34$^c$. (See dotted lines in Fig. 3.) Said rolls 33 33' are located adjacent said cam-plates 32 32', and a spring 35, which connects the ends of levers 27 27', holds said cam-plates constantly in contact with said rolls.

A bell-crank lever 36 is pivoted to a lug 6$^e$ on the frame 6, and said lever is provided with a slot 36$^a$, (see Fig. 1,) in which a depending pin 7$^h$ on the under side of lever 7 is located and adapted to work. The opposite end of said lever 36 is pivoted to one end of the operating-rod 37, which extends longitudinally of frame 6 and is bent upwardly at its rear end and connected to the rear side of sliding plate 25 by a bolt 38.

A rod 39 is journaled on the trunnions 39$^a$ at its ends in the lugs 6$^d$. (See Fig. 2 and detail Fig. 5.) Said rod is provided with two upwardly-extending arms 39$^b$ 39$^c$, having side tools 40 41 removably and adjustably connected to their upper ends. An arm 39$^d$ extends downwardly from said rod, and a link 42 connects the lower end of arm 39 with operating-rod 37.

The operation is as follows: The trolley-wheel 5, which is to be turned down, is secured in place on the arbor 3, and the lever 7 is moved so that its front end is in its extreme right-hand position, as shown in dotted lines, Fig. 1, and the roll 10$^b$ is located in the notch 13$^b$. The tools are set so as to take off the desired amount of metal, and the screw 14 is rotated continuously. When the parts are in the position just described, the spring 23 will be free to lift the nut 19 out of engagement with the screw 14. To start the machine, so that the tools will perform their several functions, the operator presses on the treadle 19$^d$, drawing down rod 18 against the action of spring 24, so that the threads of the nut 19 immediately come into engagement with the threads of the screw, moving the nut at once to the left. As soon as the nut 19 is advanced to any extent the lugs 22$^a$ on the sleeve 22 are carried under the inwardly-extending flanges 23$^b$ of the plates 23, so that the nut 19 will be held in engagement with the threads of the screw 14. As the nut is moved to the left it will draw with it the front end of lever 7 through the medium of the link 20, swinging said lever on its pivot-bolt 12. As the lever 7 swings it will be moved longitudinally by the cam-slot 13$^a$. This movement is permitted by the universal connection shown in Fig. 4, the block 11 swinging on its trunnions 11$^a$ and the frame 8 swinging on the pivot-bolts 9, so that the vertical position of the pivot 12 will be substantially maintained. The slight rising and falling of the rear end of lever is inappreciable, as the distance which the frame 8 is moved from the vertical in either direction is little. The frame is in the vertical position when the lever 7 is at the middle point of its forward movement.

The combined swinging and longitudinal movement of lever 7 is as follows: The front end of lever 7 first moves laterally a short distance, bringing the cutting edge of the tool 7$^c$ into engagement with the side of the wheel 5 at the point where the round edge of the side flange begins to leave the side. The tool 7$^c$ is then moved away from the arbor 3 or backwardly and laterally, forming half the round edge of the wheel-flange, then forwardly and laterally into the deep central groove. When the middle point is reached, the lateral movement continues and the tool is carried back through the same movements in the reverse order, finishing the groove and opposite flange. As soon as the tool 7$^c$ leaves the work the lugs 22$^a$ pass out from under the flanges 23$^b$, so that the collar 23 is no longer held down thereby. This permits the spring 24 to instantly lift the nut 19 out of engagement with the screw 14, thus stopping further movement of lever 7 in that direction. The rod 18 and connected parts are then returned to their initial position by pulling on the lever 10$^c$. The action of pulling on the lever 10$^c$ rotates the bolt 10 and eccentric 10$^a$ in the roll 10$^b$, so that the bolt will be swung back, and the tool 7$^c$ will be drawn away from the surface which it has just turned a sufficient distance to clear the same, and no mark will be made thereon by the tool as it is moved back.

The operation when the modification shown in Figs. 9 to 12 is used is as follows: When the lever 7 is thrown around to the right in the dotted position shown in Fig. 1, the roll 48$^b$ will be in the section marked $m$ of the cam-path 49$^a$. In this position the roll end of the lever 48 will be lowered below the horizontal, so that the upper surface of the bit 46 will be inclined away from the trolley-wheel which is being turned. As the lever 7 is swung to the left the roll will pass upwardly and will be horizontal just as the tool starts to move inwardly to cut out the center groove of the wheel. The roll will then be carried above the horizontal to the section of the cam, so that the tool will be tilted in the opposite direction and away from the surface which is being cut until it reaches the center of the wheel, when it will be returned to the horizontal position shown in Fig. 10. The roll will then be dropped and held in the lower position $o$ until the opposite side of the groove is turned off, and then it will again be lifted to position $p$ and finish the last portion of the face. In all of these positions the tool will be inclined downwardly from the immediate surface with which the tool is in contact, so that the cutting edge of the bit will be presented to the work at an acute angle instead of at right angles, thus enabling it to cut the metal more readily. When the tool becomes dull, it is simply necessary to draw out the bit and grind off the end and then slip it back into its aperture $45^a$. If a material amount is cut off the end of the bit, it will be necessary to turn up the screw 51, so that the end of the bit will not be below the center of the work. As the bit swings laterally in either direction by the action of the cam $49^a$ the lower end of the bit will slide in the block 52, which supports it. As previously described, the pin $7^h$ is in constant engagement with the slotted end $36^a$ of lever 36, so that as lever 7 is swung from right to left said end will also be moved in the same direction. This movement will cause the opposite end of lever 36 to be drawn back, carrying with it the bar 37. The latter communicates this motion to the sliding plate 25. The plate 25 carries with it the levers 27 27', and as said plate is moved forward the rolls 33 33', which are constantly engaged by the cam-plates 32 32' by the action of spring 35, will force the tools 30 30' inwardly, so that they will follow the curve of the side of the work or wheel 5. These tools 30 30' being supported on the opposite side of the work from tool $7^c$ must obviously be held with the cutting edge down. Their position will be such that they will take the chip exactly where tool $7^c$ leaves it, so that the surface turned by all of said tools will be smooth and continuous. As the hand-lever is pulled to draw over the front end of lever 7 a treadle which draws down the rod $34^b$ will be pressed, so that the tapered rolls 33 33' will be drawn down therewith. This permits the spring 35 to draw the rear ends of levers 27 27' together, throwing the tools 30 30' away from the sides of the work as the tools are drawn back by the action of swinging back the lever 7. The side tools 40 41 for squaring up the ends of the hub are also operated by the bar 37. When lever 7 is in its normal position, the tools 40 41 will be thrown out a considerable distance from the work. As the lever 7 is moved to the left and the bar 37 drawn forward the link 42 will swing arm $39^d$ forward and the arms $39^b$ $39^c$ back, bringing the tools 40 41 into working contact with the ends of the hub. The throw of the arms $39^b$ $39^c$ $39^d$ is such that the points of tools 40 41 will just reach the arbor which supports the work at the time the swinging movement of lever 7 is arrested.

From the foregoing description it will be observed that the entire surface of the trolley-wheel is cleaned or turned down at one operation, this operation being wholly automatic.

It is obvious that various changes and modifications may be made without departing from the spirit of the invention.

Having described my invention, what I claim as new, and desire to secure by Letters Patent of the United States, is as follows:

1. A turning device consisting of a rotating shaft to which the work is secured, a pivoted lever having a tool secured thereto, means for producing longitudinal movements of said lever, a feed-screw having jointed connections with said lever, which is adapted to swing said lever on its pivot, a fixed cam-slot, a pin carried by said lever for engaging said slot, whereby said lever will be caused to simultaneously swing laterally and move longitudinally.

2. A turning device comprising a rotating shaft to which the work is secured, a pivoted lever having tool secured thereto, means for producing longitudinal movements of said lever, a feed-screw having jointed connections with said lever, which is adapted to swing said lever on its pivot, a cam, means for causing said cam to move said lever longitudinally while it is moved laterally.

3. A turning device consisting of a rotating shaft, to which the work is secured, a main operating-lever, a tool secured thereto, which is arranged to engage the work at one side of the shaft, means for swinging said lever on its pivot, means for simultaneously moving said lever longitudinally, a pair of secondary levers carrying tools which are adapted to engage the work at the opposite side of the shaft, means connecting said main lever to said secondary levers, which are adapted to move the latter simultaneously with the movement of the former.

4. A turning device consisting of a rotating shaft, to which the work is secured, a main operating-lever, a tool secured thereto, which is arranged to engage the work at one side of the shaft, means for swinging said lever on its pivot, means for simultaneously moving said lever longitudinally a pair of secondary levers carrying tools which are adapted to engage the work at the opposite side of the shaft, means connecting said main lever and said secondary levers which are adapted to swing the latter on their pivots and move them longitudinally, simultaneously with the movement of the former.

5. A turning device consisting of a rotating shaft to which the work is secured, a main operating-lever, a tool secured thereto which is arranged to engage the work at one side of the shaft, means for swinging said lever on its pivot, means for simultaneously moving said lever longitudinally, a pair of secondary levers carrying tools which are adapted to engage the work at the opposite side of the shaft, a reciprocating support for said secondary levers, a rod connected to said support, connections between said rod and said main lever which will cause said rod to reciprocate when said main lever is swinging on its pivot, and means which are adapted to engage said secondary levers and swing them on their pivots during their reciprocating movements.

6. A turning device consisting of a rotating shaft to which the work is secured, a main operating-lever, a tool secured thereto which is arranged to engage the work at one side of the shaft, means for swinging said lever on its pivot, means for simultaneously moving said lever longitudinally, a pair of secondary levers carrying tools which are adapted to engage the work at the opposite side of the shaft, a reciprocating support for said secondary levers, a rod connected to said support, connections between said rod and said main lever which will cause said rod to reciprocate when said main lever is swinging on its pivot, a spring which acts constantly to draw the tools of said secondary levers in one direction, a cam arranged between each of said levers and a fixed portion of the machine which causes said levers to swing as they are reciprocated.

7. A turning device consisting of a rotating shaft to which the work is secured, a lever carrying a tool which is adapted to engage the work, a reciprocating support to which said lever is pivoted, a spring which acts constantly to draw the tool away from the work, a cam carried by said lever, a conical roll with which said cam is drawn in contact by said spring, and means for moving said roll longitudinally.

8. A turning device consisting of a rotating shaft to which the work is secured, a movable support carrying a tool, means for moving said tool with respect to the work, a feed-screw, means for rotating the same, a nut which is adapted to engage one side of said screw, a connection between said support and said nut, means for holding said nut in engagement with said screw, and means for automatically moving said nut laterally out of engagement with said screw when said support has been moved a predetermined distance.

9. A turning device consisting of a rotating shaft to which the work is secured, a movable support having a tool which is adapted to engage the work, a screw-threaded shaft, means for rotating the same, a nut which is adapted to engage one side of said shaft, a suitably-guided rod which is connected to said nut, a spring which acts constantly to draw said nut out of engagement with said screw, a projection carried by said rod, an inwardly-projecting flange which is adapted to engage the upper side of said projection and hold said nut in engagement with said screw-thread, connections between said rod and said movable support, said flange being of such length that said projection will pass from under the same when said support has been moved the desired distance and permit said spring to move said nut out of engagement with said screw, said part being arranged so that said projection may pass above said flange and move above the same as the support is returned to its initial position.

10. A device for turning trolley-wheels consisting of a rotating shaft to which a trolley-wheel is secured, a tool-holder, means for moving the same laterally and longitudinally of the wheel so as to turn off the face thereof, a reciprocating carriage, a rod connected to said carriage, means connecting said rod and said tool-holder for reciprocating said rod as said holder is moved from one side of the wheel to the other, side tools connected to said carriage which are adapted to engage the sides of the wheel, means for moving said side tools laterally with respect to the line of movement of said carriage as the latter is reciprocated, a pair of tool-carriers provided with tools which are adapted to engage the ends of the hub of the wheel, and means connecting said tool-carrier and said rod which are adapted to cause the tool of said carrier to engage the wheel-hubs as said rod is reciprocated.

11. A turning device comprising a rotatable shaft to which the work is secured, a pivoted lever, means for simultaneously swinging said lever on its pivot and moving it longitudinally, a tool secured to said lever, and means for tipping said tool laterally in either direction during the movements of the lever.

12. A turning device comprising a rotating shaft to which the work is secured, a tool having a bit, the upper or cutting end portion of which is cylindrical and the end of which is substantially flat and in a plane perpendicular to the center line of the bit, means for supporting said bit and for adjusting the same vertically and means for automatically varying the inclination of said bit so that it will engage the work at various angles while it is taking off the same chip.

13. A turning device comprising a rotating shaft to which the work is secured, a tool which is supported adjacent thereto, and has a normally horizontal cutting edge, a bearing in which the shank of said tool is journaled so that it may be tipped laterally in either direction, a lever connected to said tool, a cam which engages said lever and means for moving said bearing laterally with respect to the work.

In testimony whereof I have affixed my signature in presence of two witnesses.

BERNARD GALLAGHER.

Witnesses:
LOUIS H. HARRIMAN,
M. C. JAQUITH.